INVENTOR.
RICHARD J URBAN

PROCESS FLOW DIAGRAM FOR A HYDROCRACKING SYSTEM

INVENTOR.
RICHARD J. URBAN

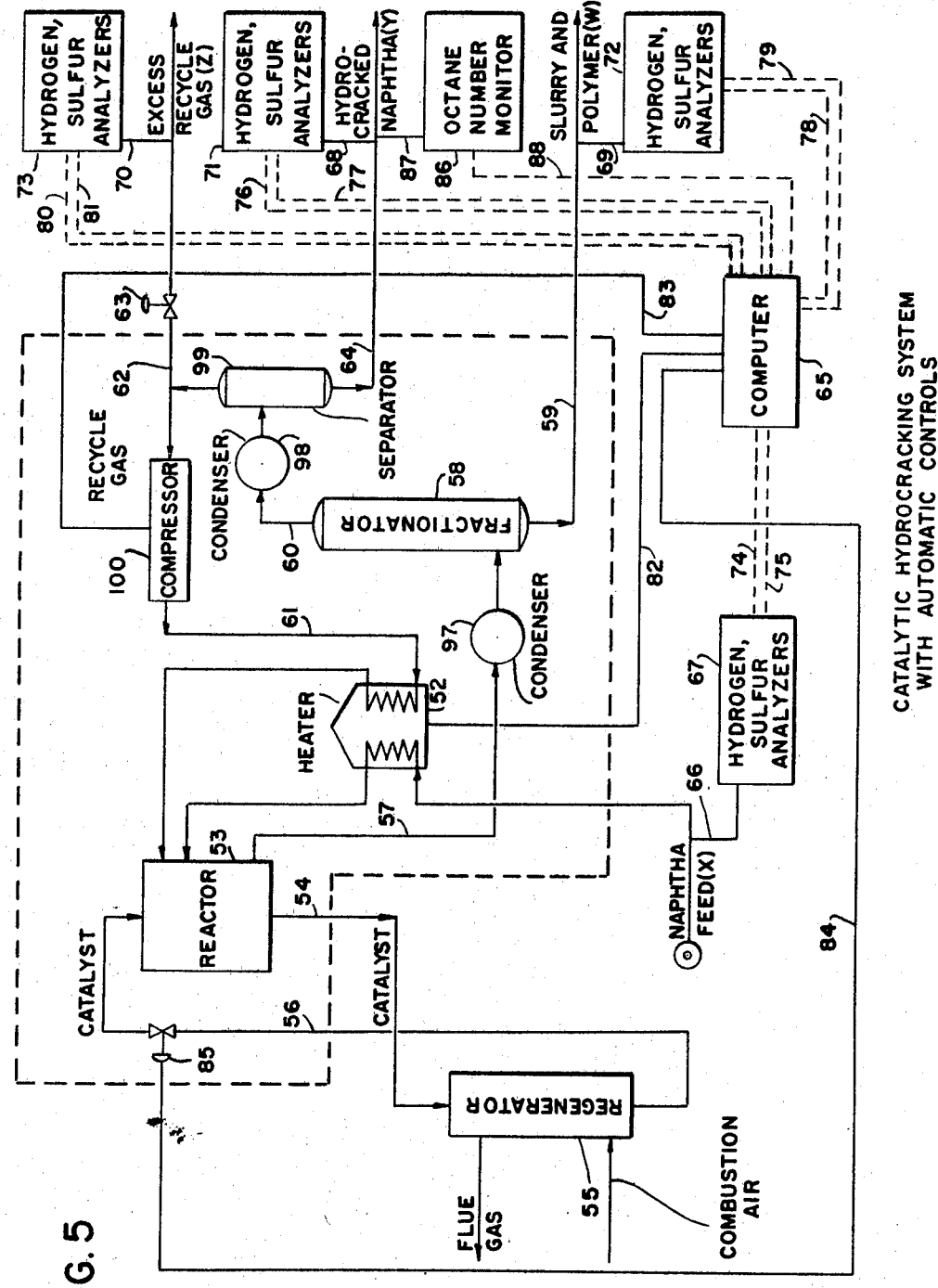

United States Patent Office 3,497,449
Patented Feb. 24, 1970

3,497,449
CONTROLLING A CONTINUOUS PROCESS BY
CONCENTRATION MEASUREMENTS
Richard J. Urban, Westfield, N.J., assignor to Mobil Oil
Corporation, a corporation of New York
Continuation-in-part of application Ser. No. 335,610,
Jan. 3, 1964. This application May 17, 1966, Ser.
No. 557,853
Int. Cl. B01j 1/00; C10g 13/02; G05d 11/08
U.S. Cl. 208—108                             14 Claims

ABSTRACT OF THE DISCLOSURE

A method of determining a weight ratio between two streams of a process involving a total of at least three input and output streams, and stream components differing in concentration between at least two of the streams and totaling at least one less than the number of the streams. Signals are generated that are representative of the concentrations of a number of components, at least as great as two less than the number of streams, that are present in at least two of the streams, and that are withdrawn from the process at substantially the same rate at which they enter the process. These signals are then used to generate the weight ratio function, and the function may be used as a basis for controlling the process.

---

This application is a continuation-in-part of Ser. No. 335,610, filed Jan. 3, 1964, now abandoned.

The present invention relates to a method for monitoring a continuous process involving input and output streams totaling at least three such streams and more particularly, to a method for monitoring the weight ratio between two streams of such a process. The invention also relates to a method for controlling such a continuous process responsive to such a monitored weight ratio to maintain a desired condition or result. It is particularly applicable to such a process having at least two components present in each of at least two such streams of the process.

In many types of continuous processes, it is desirable to achieve a maximum yield, which can be expressed as the weight ratio of a specified product stream to a specified feed stream, while maintaining a predetermined product characteristic or a predetermined process condition. Difficulties in the analysis and control of such processes under previous practice are related to the inaccuracy of means for determining yields by flow meters and the like.

It has now been discovered that the yields of product from such processes are directly related to the concentrations of a selected component or selected components present in input and output streams of the process. The relationships may be expressed as mathematical functions easily adapted to automatic instrumentation.

The invention is applicable to a continuous process involving a total of at least three streams as a sum of input and output streams and stream components totaling at least the number of said streams less one, wherein each component selected for use in monitoring the system enters the process at substantially the same rate at which it is withdrawn from the process, in which each of the selected components is present in at least two of said streams but in different concentrations, and in which the total number of said stream components differing in concentration between at least two of said streams is at least as great as one less than the total number of input and output streams in the process. Thus, in a system for monitoring such a continuous process, the invention provides a method for monitoring the weight ratio between two of the streams of said process. This is accomplished, in accordance with this invention, by generating a concentration function representing concetration, in each of the streams of said process, of each of a number of selected components at least as great as two less than the number of said streams in said process, and employing said concentration functions to generate a resultant function representing the weight ratio between two of said streams. Thus, in a more specific embodiment comprising a system for monitoring a continuous process involving a total of three streams as a sum of input and output streams and stream components totaling at least two, wherein a component selected for use in monitoring the system enters the process at substantially the same rate at which it is withdrawn from the process, and in which said selected component is present in at least two of said streams but in different concentrations, the invention is carried out by generating a concentration function representing concentration of said selected component in each of said streams, and generating a resultant function representing the weight ratio of a second said stream to a first said stream by (1) subtracting said concentration function for said first stream from that for a third said stream to generate a first difference function, (2) subtracting said concentration function for said second stream from that for said third stream to generate a second difference function and (3) dividing said first difference function by said second difference function to generate said resultant function. In a particuarly suitable illustrative embodiment, the continuous process is useful in the catalytic reforming of naphtha, e.g. in the presence of hydrogen with net hydrogen production, and the selected component is hydrogen. In another particularly suitable embodiment, the continuous process is the catalytic hydrocracking of a petroleum hydrocarbon feed and the selected components are hydrogen and sulfur. Many other processes will become apparent from the following description of the invention as ones in which the invention can be advantageously employed.

For purposes of this specification and the appended claims, the term "stream component" should be understood to mean a component present in the stream in such a form that it can be identified and measured in terms of weight percent of the stream, such as, for example, a specific element from the Periodic Arrangement of the Elements. More specific examples of such "stream components" are the total (combined and free) hydrogen in a stream of the catalytic reforming system described hereinafter, and the total (combined and free) sulfur in a stream of the catalytic hydrocracking system also described hereinafter. It should be realized that such a "stream component," as that term is used in the present specification and claims, is not limited to such specific elements, but may be instead a combination of such elements, such as those of a specific type of molecule, ion or radical group, or a group of such elements, such as a group including all the elements in such a stream having certain identical or similar inherent characteristics, or a group including all the elements or groups of elements having variations of such a characteristic only within a predetermined range of values, so long as such a "stream component" can be measured in terms of weight percent of the process stream in which it occurs, and so long as such a "stream component" is withdrawn from the process at substantially the same rate at which it enters the process.

An example of the many process control objectives for which the invention is useful is, in the catalytic reforming process referred to above, the achievement of maximum reforming yield at a predetermined octane number of reformate. The invention finds particular application in the control of processes involving conflicting product objectives, i.e. processes in which an optimum relationship between two conflicting products characteristics is generally sought, but the invention is more broadly applicable to the control of any process of the types described hereinbefore and which involves an ascertainable relationship between process yield and some other controllable process variable.

For purposes of illustration, the description is concerned in two specific embodiments herein with catalytic reforming and catalytic hydrocracking as independent processes, although it will be appreciated that the invention is applicable to many other independent processes and also to integrated commercial operations in which one constituent process can be monitored for use in controlling the performance of the larger operation in which it is coordinated. For example, a catalytic reforming operation is generally coordinated in commercial operations with the performance of other refinery units, and it should be understood that the principles of the invention can be applied in overall automation of a refinery in which one constituent process, e.g. a reformer, is the monitored process.

With reference to the embodiment of the invention comprising catalytic reforming, reformer yield is substantially an inverse linear function of the octane rating of the $C_5+$ reformate, and the primary objective of reformer operation is accordingly the maintenance of maximum yield at a target octane. It has been recognized for some time that the performance of a catalytic reforming unit can be significantly affected by any of a number of process variables, some of which are interdependent. For example, either the reformer yield or octane number of the reformate or both can be altered by a change in the feed composition, the type or activity of the catalyst used, the temperature, liquid hourly space velocity or hydrogen-to-naphtha mol ratio in the reactor, or the concentrations of water, halogens or nitrogen in the reformer process streams.

A change in feed composition can greatly affect reformer performance by altering the types and molecular weights of molecules being reformed and the proportions of different types of reactions required to effect a desired reforming result, but this variable is inherent in the normal commercial practice of feeding naphtha from different geographical locations or naphthas distilled to different initial and/or final boiling points. Nitrogen in the feed in excess of a small amount, generally about 0.00085 mol percent, can raise the reactor vapor inlet temperature required to produce $C_5+$ reformate having a target octane and can alter the reformer product distribution, but this variable is also inherent in periodically changing the feed to a different naphtha.

Although it is possible to optimize the use of reforming catalyst, which gradually decreases in activity with onstream time, it is generally not commercially feasible to recharge a reformer frequently with different or new catalyst to offer catalyst in its most active state for the reforming of a particular naphtha feed.

It has been known that the moisture content of reformer reactant can be too low as well as too high to permit operation at an optimum balance between yield and reformate octane. Likewise, halogen concentration in the feed can have a favorable or adverse effect on reformer performance, depending on the amount present. It is known that the presence of chlorine in a small amount, generally in excess of 0.0013 mole percent of the naphtha charge, lowers the reactor vapor inlet temperature required to produce $C_5+$ reformate having a target octane, and also reduces the $C_5+$ reformate yield. However, the presence of chlorine in slightly greater concentration can amount to an intolerable contamination of the naphtha feed.

Hydrogen-to-naphtha mol ratio has more recently been recognized as an important factor in reformer production. Temperature and liquid hourly space velocity are reforming variables which are related in that, with other process variables maintained substantially constant, a decrease in reactor temperature can generally be compensated by a decrease in liquid hourly space velocity and, conversely, an increase in liquid hourly space velocity can generally be compensated by an increase in reactor temperature, so long as the reactor temperature is not raised above that which impairs the activity of the reforming catalyst.

For static beds of the conventional particle-form solid platinum-group metal reforming catalyst, the reactor vapor inlet temperature is frequently controlled to maintain the desired reaction temperature. Other variables which can be readily controlled to achieve optimum reforming conditions include liquid hourly space velocity, water and halogen concentrations in the system, and hydrogen-to-naphtha mol ratio, which can be varied by controlling the gas recycle ratio.

It is conventional commercial practice to adjust such variables intermittently, no more frequently than changes in reformer operation are now detected, and no sooner than information about such changes is received. As presently controlled, a reformer production is generally gauged not oftener than once a hour, usually not oftener than once every eight hours, and in many cases less frequently than daily. Conventionally, complete yield analyses are made about once each month. Detailed information on reformer operation can in many cases be obtained only by shipping stream samples substantial distances to analytical facilities, with the accompanying time lag between sampling and receipt of analytical results frequently preventing efficient process control based on such results.

The conventional method of determining product yields is by constructing an over-all material balance around the reforming unit. This involves determining the composition and flow rates of the primary process streams, i.e. the reformer feed, the light gas discharge, and the high pressure separator bottoms. The composition of each stream can be obtained accurately with analytical tools such as the mass spectrometer and chromatograph. However, flow rates are still conventionally measured by means of orifice meters and tank gauging. Both of these methods of flow rate measurement are subject to errors as great as three to four percent. In a unit treating 10,000 barrels of naphtha per day, measurement errors of this magnitude can result in feed rate miscalculations of 300 or more barrels per day. Taken in conjunction with errors of comparable magnitude in the measurement of reformate, those errors greatly hamper any attempts to optimize performance of the unit. The infrequency of yield and octane ratings constitutes a further impediment to heretofore practiced efforts to optimize reformer operation.

It will be apparent that, although catalytic reforming is desirably controlled to a simple relation of weight percent yield and octane number, the operating conditions and feed characteristics constitute a complex set of variables which must be properly correlated to achieve optimum performance. This invention makes possible a prompt and continuous determination of deviations from optimum yield-octane relationships and provides means and techniques for initiating corrective action. These and other objects and advantages of the invention will be apparent from the detailed description below, taken with annexed drawings, wherein:

FIG. 5 is a diagrammatic representation of a catalytic hydrocracking system with associated automatic controls embodying the principles of this invention.

Figure 1:
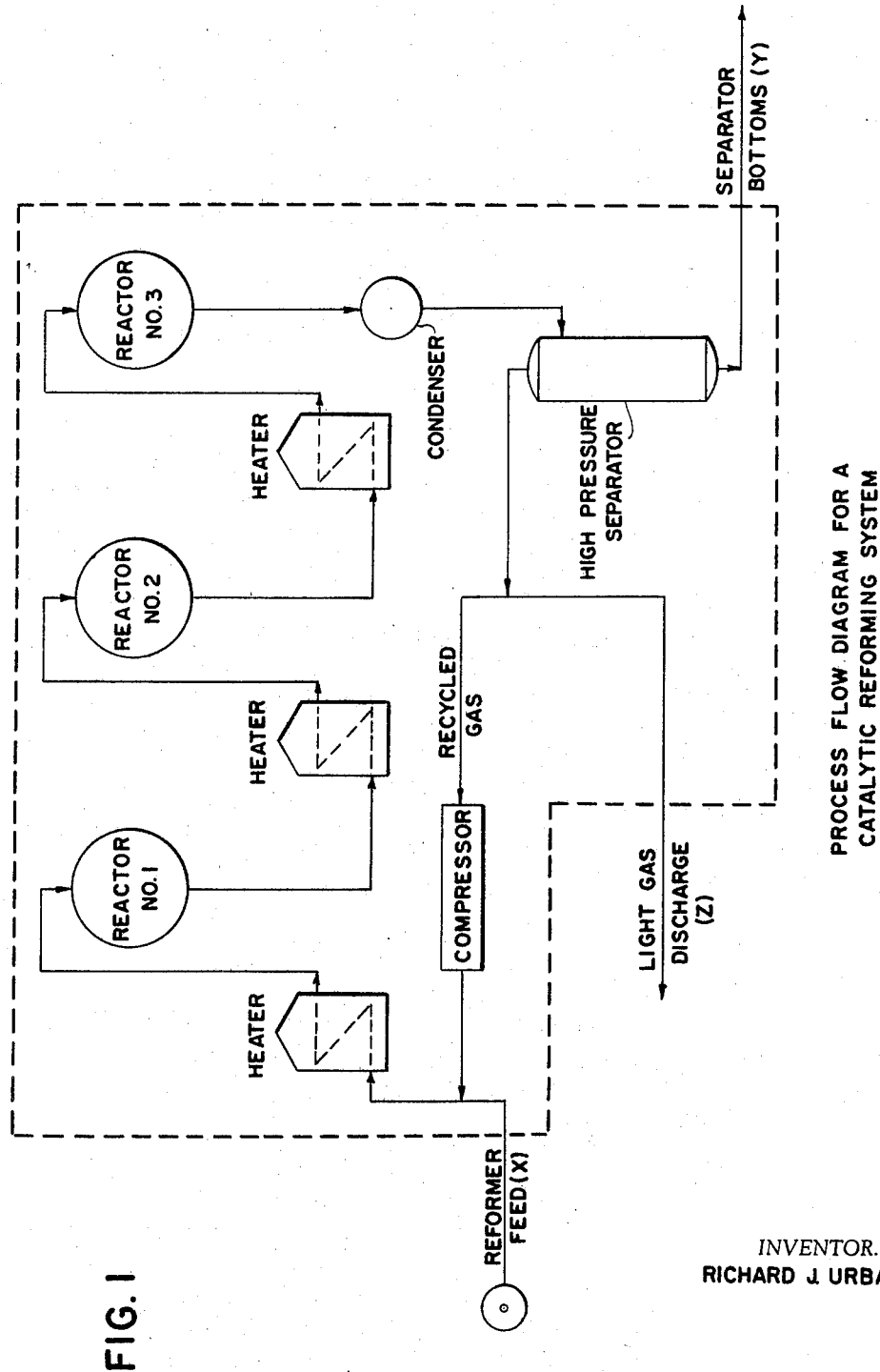
FIG. 1 is a process flow diagram for a catalytic reforming system.

From the diagram of FIG. 1, a material balance can be calculated on elements within the broken line envelope including the reforming system of multiple heaters and reactors, the high pressure separator and gas recycle from separator to reactors. This operation can be represented by the equations:

$$X = Y + Z \qquad (I)$$

where:

X is the weight of reformer feed per unit time;
Y is the weight of separator bottoms (product) per unit time; and
Z is the weight of light gas discharge per unit time;

and:

$$aX = bY + cZ \qquad (II)$$

where:

X, Y and Z have the values previously stated;
$a$ is the weight fraction of hydrogen in the reformer feed;
$b$ is the weight fraction of hydrogen in the separator bottoms; and
$c$ is the weight fraction of hydrogen in the light gas discharge.

Solving Equations I and II simultaneously gives the relationships:

$$\frac{Y}{X} = \frac{c-a}{c-b} \qquad (III)$$

and:

$$\frac{Z}{X} = \frac{a-b}{c-b} \qquad (IV)$$

Assuming that the three streams represent all material entering and leaving the unit and that all entering material leaves in the streams designated, the yield of reformed naphtha is a function of weight percent hydrogen in the streams designated X, Y, and Z. In a catalytic reformer, those assumptions are justified since no significant amount of coke is formed and leaks of significance can be detected.

It should be apparent that Equation III may be written:

$$\frac{Y}{X} = \frac{a-c}{b-c} \qquad (V)$$

However, the form of (III) is generally preferred as involving substraction of lesser from greater numbers, that is, hydrogen content is usually greatest in the light gas stream. Equation IV may be similarly converted by multiplying numerator and denominator of the right hand term by (−1).

The method of this invention can be applied to control of a catalytic reformer by determining hydrogen content by weight of the three streams by suitable analytical techniques, preferably continuous streamv analyzers, and calculating product yield by Equation III. It should be apparent that the Equations I and II can be used for three-stream operations differing from that shown in FIG. 1. For example, for use with a hydrogenation process involving a first input stream of hydrogenateable feed stock, a second input stream containing hydrogen, and an output stream of hydrogenated product, the term representing the "light gas discharge" stream on the right-hand sides of Equations I and II can be assigned a negative value to represent the hydrogen-containing second input stream of the hydrogenation process.

Reverting to the catalytic reforming system of FIG. 1, a "model" of such an operation can be utilized for calculation of optimum operation. Linear programs are suitable models for that purpose and can be employed in computer control of reformers by the principles of this invention. For simplicity of explanation, the discussion below is directed to an embodiment in which the reforming unit is itself the model for optimization of performance, it being understood that the same function may be served by a mathematical model similarly manipulated by a controlling computer routine.

Figure 2:
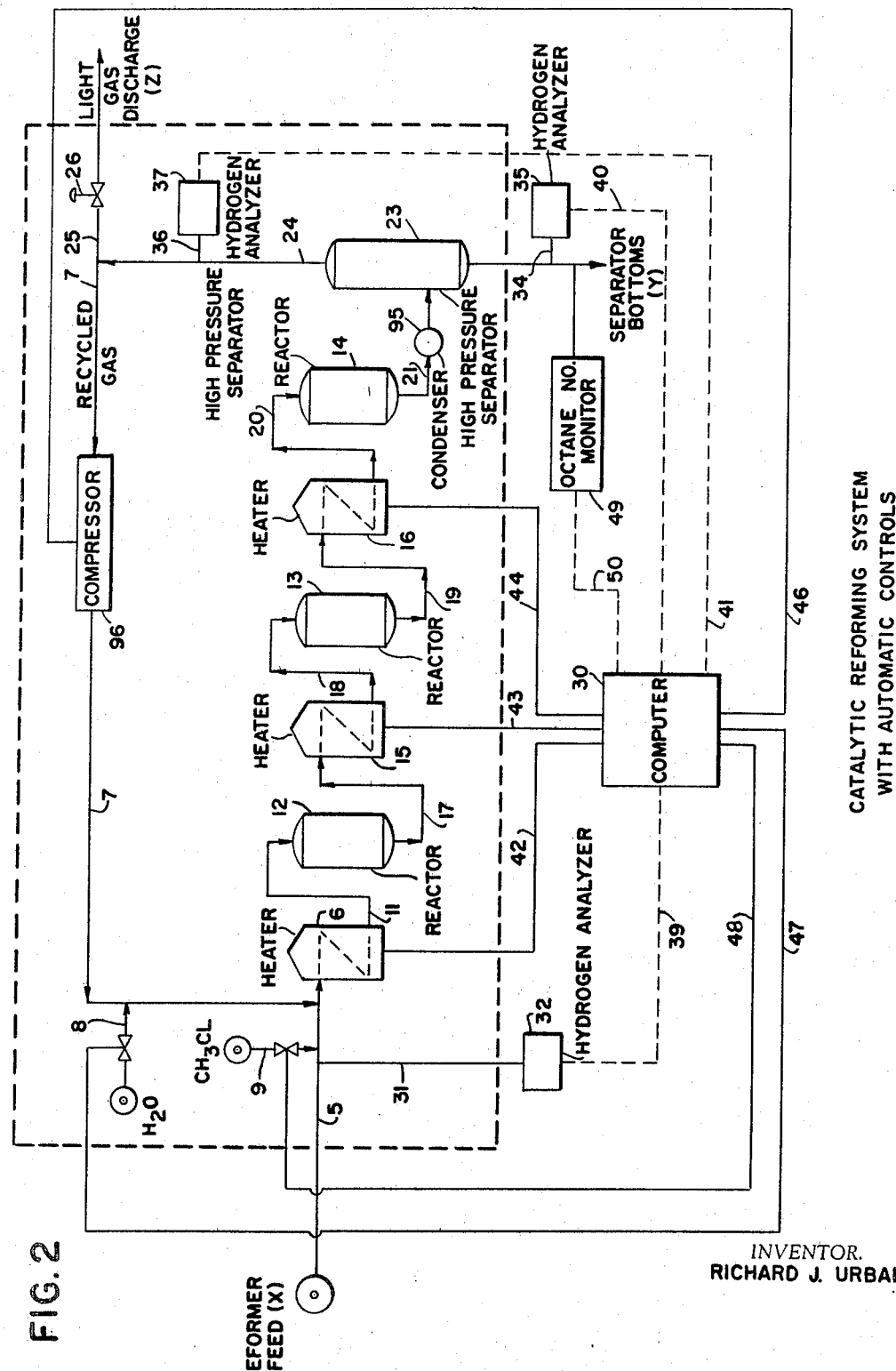
FIG. 2 is a diagrammatic representation of a catalytic reforming system with associated automatic controls embodying the principles of this invention.

One such scheme for applying this invention is illustrated by FIG. 2 wherein naphtha feed is supplied by line 5 to a first heater 6 in combination with a hydrogen-rich recycle gas from line 7. Valved lines 8 and 9 are adapted to add water and methyl chloride to the combined feed stream in controlled amounts responsive to computer control hereinafter described. In the three-reactor system shown, the charge passes from heater 6 through transfer line 11 to first reactor 12 and thence through reactors 13 and 14, with which are associated heaters 15 and 16 to maintain reaction temperature. Suitable transfer lines 17, 18, 19 and 20 conduct the reactants through the series of alternate heaters and reactors.

On completing the reacting series, product effluent passes by line 21 through a condenser 95 and then to a high pressure separator 23 wherein gas is separated from a liquid product and passed overhead by vapor line 24 to be in part compressed by recycle gas compressor 96 and recycled through line 7 to heater 6, and in part discharged from the system by line 25 under control of the pressure maintenance valve 26.

The invention is applied to this conventional system by means of a computer 30 deriving input data representative of hydrogen concentration in the feed, separator bottoms (product) and gas discharge streams. A sample of naphtha feed is supplied by line 31 to hydrogen analyzer 32. Similar samples of separator bottoms and gas discharge are transferred by lines 34 and 36 to analyzers 35 and 37. From the analyzers, input data in suitable analog or digital form are supplied to computer 30 by lines 39, 40 and 41. Control signals generated by the computer are transmitted by conventional means, e.g. electrical or pneumatic signal means, to be utilized to modify operation of the reformer through suitable servomechanisms of types now in wide use. For example, a need for increased reaction temperature generates a signal passed by lines 42, 43, and 44 to reset temperature controllers of the heaters 6, 15 and 16. Gas recycle ratio is varied by adjustment of the capacity of the recycle gas compressor 96 responsive to a signal in line 46 while water and halogen addition can be reset responsive to signals in lines 47 and 48, respectively. Alternatively, gas recycle ratio can be varied by adjustment of the flow rate of fresh reformer feed into the unit.

Preferably the system also includes means for generating an operational function representing a process variable, e.g. a variable stream characteristic, related to process yield but also desirably controlled. For example, the system can include an octane number monitor 49 by means of which a signal representing liquid product quality may be supplied to the computer 30 through line 50. The octane number monitor is advantageously an automated CFR engine such as that disclosed in U.S. Patent 3,238,765, issued Mar. 8, 1966 to William E. Beal, which disclosure is here incorporated by reference. If desired, the octane number monitor can be readily applied to redistilled product, for example, to product debutanized in a conventional manner.

Beta ray analysis is an effective and accurate method of determining hydrogen content of the three streams monitored for that value. Thermal conductivity, vapor pressure, and density are properties which can be correlated with weight percent hydrogen and instruments for measuring those properties can be used as hydrogen monitors if checked periodically for accurate calibration, or mass spectrometers may be used. Chromatography is also a useful technique for deriving information on composition which can be converted to hydrogen content. For practice of the invention, any of these analytic techniques can be used, as well as any other analyzing means suitable for generation of a signal which is a function of the monitored hydrogen concentration and adaptable to process control.

Figure 3:
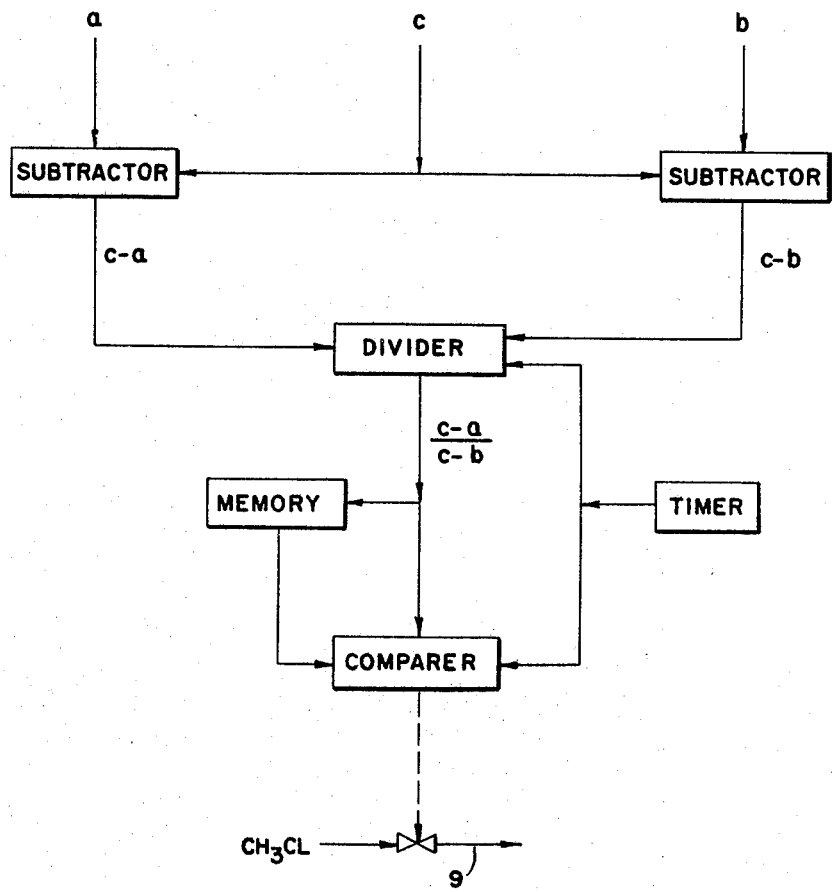
FIG. 3 is a diagrammatic representation of a computer routine which can be employed in the practice of the present invention in conjunction with a catalytic reforming system.

FIGURE 3 is a diagrammatic representation of a computer routine which can be employed in the practice of the present invention in conjunction with a process such as the catalytic reforming example just described. Signal $c$, representing hydrogen concentration in the light gas discharge, is fed to each of two subtractor units. Signal $a$, representing hydrogen concentration in the reformer feed, is fed to one of the subtractor units and signal $b$, representing hydrogen concentration in the separator bottoms, is fed to the other. $a$ and $b$ are separately subtracted from $c$ by their respective subtractor units and the resulting difference signals $c-a$ and $c-b$ are fed to a divider unit, by which they are divided to produce a signal representing the quotient $c-a/c-b$. The quotient signal is fed to a comparer unit to which the process yield data in the memory unit is available, for comparisons following a schedule controlled by a preset timer unit. The quotient signal can also be fed to a computer memory unit to enlarge the data stored there for future comparisons with monitored values. The comparer unit provides a signal representing the relationship between the currently monitored yield and the yield data in the memory unit, which can be applied to conventional servomechanisms to control a process condition, e.g. the rate of methyl chloride addition through valved line 9 to the reactor feed or any other process condition of the type described hereinbefore as suitable for process control directed toward a desired process result.

The primary purpose of making hydrogen balance runs is either to check or control the reformer performance, or to measure the results of some particular field test. More specifically, the introduction of this method can be used in refineries to help: (1) optimize the frequency of catalyst regenerations; (2) diagnose trouble spots; (3) improve reforming operations; and (4) establish justification for catalyst replacement. These objectives are accomplished by using the hydrogen balance technique to obtain accurate yields for assessing platinum reforming performance. This is done by comparing these yields with predictions for ideal operation at the same process conditions. The optimum yields are estimated by empirical data and correlation theories well established in the art. An entire product distribution can be calculated using the hydrogen balance technique and an analysis of the process streams. The comparison of such a product distribution to a theoretical optimum distribution is an important factor in refinery technique.

In the example set forth below the weight proportions of excess recycle gas and separator bottoms, based on charge, were computed using the hydrogen contents of the feed and two effluent streams. The analytical data in this example were obtained by chromatographic analysis of the three sample streams and by quantitative combustion of the liquid streams. Table 1 sets forth the data from a chromatogram of the platinum reformer feedstock, the separator bottoms, and the light gas discharge (excess recycle), as each of these terms are illustrated in FIGURE 1. The data from the chromatogram presents the composition of the major components in each of the sample streams. The liquid's hydrogen content is readily determined by the method set forth in U.S. Patent 3,207,585, issued Sept. 21, 1965 to Glass and Liederman. An analysis of the light gas discharge is set forth in Table 2 based upon the analytical data obtained.

From the hydrogen content of the samples the weight proportions of the light gas discharge and separator bottoms based on the PtR feed is readily computed. The calculation is set forth below.

From Table 1, $a=.1459=$H content of PtR feed, weight fraction

From Table 1, $b=.1331=$H content of separator bottoms, weight fraction

From Table 2, $c=.3330$ (.33299)$=$H content of light gas discharge, weight fraction TABLE 1.—TYPICAL ANALYSES OF PtR SAMPLES FOR CHROMATOGRAPHIC HYDROGEN BALANCE TEST RUN

| Stream composition | PtR feed, percent vol. | Separator bottoms, percent vol. | Recycle gas, percent mole |
|---|---|---|---|
| $H_2$ | | | 73.36 |
| $C_1$ | 0.37 | 0.60 | 11.89 |
| $C_2$ | 1.14 | 4.47 | 8.06 |
| $C_3$ | 1.23 | 7.79 | 4.57 |
| $iC_4$ | 0.40 | 3.29 | 0.78 |
| $nC_4$ | 0.56 | 5.54 | 0.89 |
| $iC_5$ | 0.50 | 5.81 | 0.29 |
| $nC_5$ | 0.55 | 3.81 | 0.16 |
| $C_6+$ | 95.25 | 68.69 | 0.00 |
| Total | 100.00 | 100.00 | 100.00 |
| $H_2$ content, percent wt. | 14.59 | 13.31 | |

TABLE 2.—CALCULATING WEIGHT COMPOSITION AND HYDROGEN CONTENT OF RECYCLE GAS

| Component | Composition, percent mole | Component, molecular wt. | Weight grams | Composition, percent wt. | Wt. fraction hydrogen in molecule | Wt. Fraction hydrogen in sample |
|---|---|---|---|---|---|---|
| | I | II | I×II | III | IV | III×IV |
| | | | 100 | | | 100 |
| $H_2$ | 73.36 | 2.016 | 1.4789 | 16.216 | 1.000 | 0.16216 |
| $C_1$ | 11.89 | 16.042 | 1.9074 | 20.914 | 0.2513 | 0.05256 |
| $C_2$ | 8.06 | 30.068 | 2.4235 | 26.573 | 0.2011 | 0.05344 |
| $C_3$ | 4.57 | 44.094 | 2.0151 | 22.095 | 0.1829 | 0.04041 |
| $iC_4$ | 0.78 | 58.120 | 0.4533 | 4.971 | 0.1734 | 0.00862 |
| $nC_4$ | 0.89 | 58.120 | 0.5173 | 5.672 | 0.1734 | 0.00983 |
| $iC_5$ | 0.29 | 72.146 | 0.2092 | 2.294 | 0.1677 | 0.00385 |
| $nC_5$ | 0.16 | 72.146 | 0.1154 | 1.265 | 0.1677 | 0.00212 |
| $C_6+$ | 0.00 | | 0.0000 | 0.000 | | 0.00000 |
| Total | 100.00 | | 9.1201 | 100.000 | | 0.33299 |

Weight fraction separator bottoms based on
$$\text{PtR feed} = \frac{Y}{X} = \frac{c-a}{c-b}$$

$$\frac{Y}{X} = \frac{0.3330 - 0.1459}{0.3330 - 0.1331} = \frac{0.1871}{0.1999} = 0.936$$

Weight fraction separator bottoms based on
$$\text{PtR feed} = \frac{Z}{X} = \frac{a-b}{c-b}$$

$$\frac{Z}{X} = \frac{0.1459 - 0.1331}{0.3330 - 0.1331} = \frac{0.0128}{0.1999} = 0.064$$

The actual yield distribution obtained from the chromatographic data and the hydrogen balance test runs can be compared with standard yields to evaluate the performance of a performance of a platinum reforming unit. The standard yield data can be estimated from correlations which have been developed based upon the type of charge stock and the processing conditions. The decisions which can be made regarding reformer operations involve such parameters as the cycling between regenerations, the number of times the catalyst should be regenerated before replacement, the hydrogen/hydrocarbon recycle ratio and the reactor pressure. Determination of the most economical cycling of a platinum reforming unit is one of the most important factors to be considered. The optimum cycle length is determined primarily from a comparison of the cost associated with the loss in yield with the cost associated with regeneration and replacement of the catalyst. A plot of data derived from an analysis of the product based upon the hydrogen balance technique can be used to calculate the yield loss during the reforming operation. It is from this data that a decision can be made regarding catalyst regeneration and replacement. Prior to the method of this invention complete yield analyses were conducted approximately monthly. The hydrogen balance technique enables the operator to analyze performance several times weekly, or more often, and therefore to exercise closer control over the unit. The calculations for this procedure are preferably programmed for computer solution, which greatly facilitates the use of this technique.

The applicability of the invention to processes involving input and output streams totaling more than three, e.g. four streams, such as, for example, catalytic hydrocracking of a petroleum hydrocarbon feed, is demonstrated by the following detailed description of the method of this invention for monitoring the yield of such a process without stream mass flow measurements by conventional means such as flowmeters, tank gauging, etc. In an example directed to catalytic hydrocracking, FIG. 4 is a process flow diagram of a catalytic hydrocracking system, and FIG. 5 is a diagrammatic representation of the catalytic hydrocracking system with associated automatic controls embodying the principles of this invention.

Figure 4:
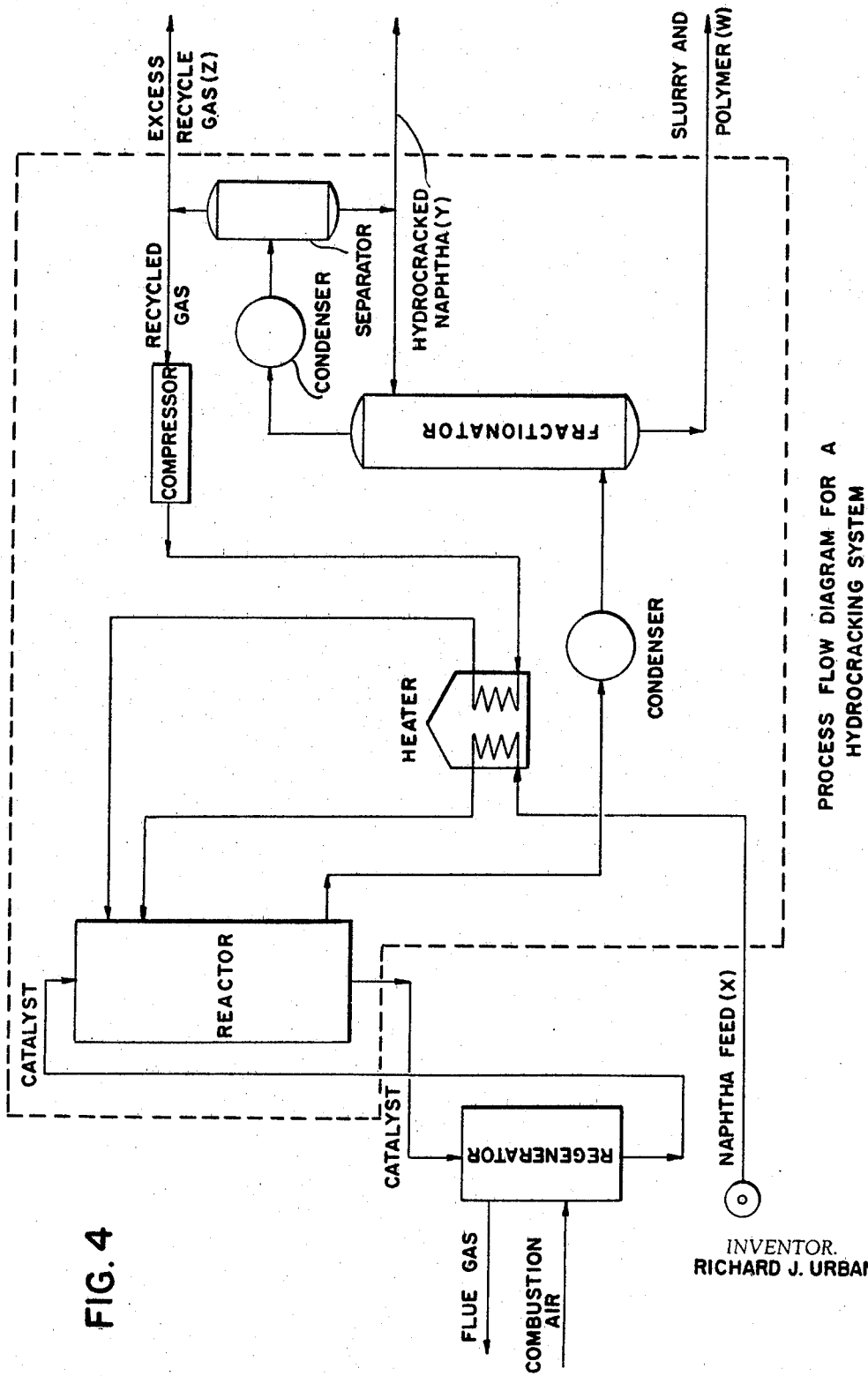
FIG. 4 is a process flow diagram for a catalytic hydrocracking system.

From the diagram of FIG. 4, a material balance can be calculated on elements within the broken line envelope including the hydrocracking system of a heater, reactor, fractionator, separator and gas recycle from fractionator to reactor. This operation can be represented by the equations:

$$X = W + Y + Z \qquad (VI)$$

where:
W is the weight of slurry and polymer discharged per unit time;
X is the weight of naphtha feed per unit time;
Y is the weight of hydrocracked naphtha (product) per unit time; and
Z is the weight of excess recycle gas discharged per unit time;
and:

$$aX = dW + bY + cZ \qquad (VII)$$

where:
W, X, Y and Z have the values represented in Equation VI;
$a$ is the concentration by weight of hydrogen in the naphtha feed;
$b$ is the concentration by weight of hydrogen in the hydrocracked naphtha;
$c$ is the concentration by weight of hydrogen in the excess recycle gas; and
$d$ is the concentration by weight of hydrogen in the slurry and polymer;
and:

$$qX = tW + rY + sZ \qquad (VIII)$$

where:
W, X, Y and Z have the values represented in Equation VI;
$q$ is the concentration by weight of sulfur in the naphtha feed;
$r$ is the concentration by weight of sulfur in the hydrocracked naphtha;
$s$ is the concentration by weight of sulfur in the excess recycle gas; and
$t$ is the concentration by weight of sulfur in the slurry and polymer.

Solving Equations VI, VII, and VIII simultaneously gives the relationships:

$$\frac{Y}{X} = \frac{a(t-s) + c(q-t) + d(s-q)}{b(t-s) + c(r-t) + d(s-r)} \qquad (IX)$$

$$\frac{Z}{X} = \frac{a(r-t) + b(t-q) + d(q-r)}{b(t-s) + c(r-t) + d(s-r)} \qquad (X)$$

and:

$$\frac{W}{X} = \frac{a(s-r) + b(q-s) + c(r-q)}{b(t-s) + c(r-t) + d(s-r)} \qquad (XI)$$

Assuming that the four streams represent all material entering and leaving the unit and that all entering material leaves in the streams designated, the yield of hydrocracked naphtha (product) is a function of weight percent hydrogen and weight percent sulfur in the streams designated W, X, Y and Z. In a catalytic hydrocracker those assumptions are justified since leaks of significance can be detected and there is no significant accumulation of stream components in the unit, particularly in a fluid catalytic hydrocracker, in which coke production is generally much less than in conventional catalytic cracking.

It should be apparent that the weight ratios between any two of streams W, X, Y and Z can be found by simultaneous solution of Equations VI, VII, and VIII, and that from such ratios the weight ratio of the sum of any two output streams to the input stream can be found without knowledge of the mass flow rates of any of streams W, X, Y and Z. It should also be apparent that Equations VI, VII, and VIII can be used for a four-stream operation involving two input streams and two output streams by assigning negative values to appropriate stream designations in Equations VI, VII, and VIII. For example, for use with a catalytic hydrogenation unit including a reactor, a reactor product separator, gas recycle from separator to reactor, and a separator bottoms stripper, and involving a first input stream of hydrogenateable feed stock, a second input stream containing hydrogen, a first output stream of hydrogenated product and a second output stream of stripper overhead containing hydrogen sulfide, the "excess recycle gas" stream can be assigned negative values on the right-hand sides of Equations VI, VII, and VIII to represent the hydrogen-containing input stream to such a catalytic hydrogenation unit, and the two remaining positive terms on the right sides of Equations VI, VII, and VIII would each represent one of the two output streams (of hydrogenated product and stripper overhead) from the catalytic hydrogenation unit.

With reference to the catalytic hydrocracking embodiment of the invention, the primary objective is the maintenance of maximum yield (ratio of hydrocracked naphtha product to naphtha feed) at a predetermined level of product octane number. The hydrocracking reaction can be significantly affected by any of a number of process variables, some of which are interdependent. For example, either the hydrocracking yield or the octane level of the hydrocracked naphtha product can be altered by a change in the feed composition, the type, or activity, flow rate or bed depth of catalyst used, or the temperature, space rate or hydrogen-to-feed mol ratio in the reactor.

As with the embodiment of this invention comprising catalytic reforming and described hereinbefore, feed and catalyst characteristics are process variables which can greatly affect the process yield and product quality, but which are not readily controlled in response to short-term deviations in process efficiency.

In many hydrocracking systems, the naphtha feed and recycle gas are heated to cracking temperatures, passed through the reactor in contact with a descending flow of continuously circulating hot catalyst, and cooled to condense liquid products. The cracked liquid products are separated from the hydrogen-rich uncondensed gas, part of which is compressed and recycled and part of which can be sent to the refinery gas plant. Small streams of polymer and slurry are also removed from the cracked liquid product. The remaining liquid product is cracked naphtha, which can then be stabilized by removal of light gas. Such light gas can be sent with the excess recycle gas to the refinery gas plant.

Hydrocracking reaction rates generally increase with increased temperature, and high temperatures are therefore employed in most hydrocracking processes. For conventional product requirements, and to avoid overheating the catalyst during regeneration, the reaction temperature is generally maintained between 850° F. and 1000° F. Fluid hydrocracking is somewhat less restricted in its operating range than conventional catalytic cracking and therefore permits a greater range in which the process can be controlled for varying product qualities.

The hydrocracking reaction is endothermic, but since excessive naphtha inlet temperature can cause thermal degradation of the feed, heat is generally provided to the reactor by some other method in addition to preheating the naphtha feed. In fluid hydrocracking, this heat is provided by the continuous circulation of hot catalyst. In fixed bed hydrocracking, reheaters are generally employed.

In order to insure a satisfactory hydrogen pressure at the outlet end of the reactor, a substantial amount of hydrogen-rich recycle gas must be charged with the feed. However, at a constant space velocity in the reactor, reaction rate is at least partially offset by reduced contact time between feed and catalyst, so that the recycle rate and reactor space velocity are generally balanced for optimum hydrocracking operation.

In hydrocracking processes employing conventional catalysts, e.g. platinum, cobalt-molybdena, molybdena-alumina or chromia-alumina catalysts, the reactor feed and recycle heater outlet temperatures are frequently controlled to maintain the desired reaction temperature. Other variables readily controllable in response to process fluctuations to optimize hydrocracking conditions include the gas recycle rate and catalyst flow rate through the reactor.

As in the embodiment of the invention comprising catalytic reforming and described hereinbefore, it is present commercial practice to adjust such variables in hydrocrackers intermittently, generally not oftener than hourly and in many cases much less frequently. Adjustments are generally made according to material balances which are constructed around the hydrocracking unit and are dependent on stream mass flow rates conventionally measured by orifice meters and tank gauging. Again, the errors inherent in such measuring methods and the infrequency of measurements and adjustments in response thereto greatly inhibit efforts to optimize reaction efficiency.

It will be apparent that, although catalytic hydrocracking is also desirably controlled to predetermined levels of weight percent yield and product octane number, the operating conditions and feed characteristics constitute a complex set of variables which must be properly correlated to achieve a desired hydrocracking performance. This invention makes possible a prompt and continuous determination of deviations from desired hydrocracking performance, and provides means and techniques for initiating corrective action.

A "model" of the hydrocracking operation can be utilized for calculation of optimum operation. As in the catalytic reforming example described hereinbefore, linear programs are suitable models for that purpose and can be employed in computer control of a hydrocracking unit by the principles of this invention. For simplicity of explanation, the discussion below is directed to an embodiment in which the hydrocracking unit is itself the model for optimization of performance, it being understood that the same function may be served by a mathematical model similarly manipulated by a controlling computer routine.

One such scheme for applying this invention is illustrated by FIG. 5 wherein a virgin naphtha feed is supplied by line 51 through a heater 52 to a reactor 53. In the reactor, the feed contacts a moving stream of solid particulate catalyst which is continuously withdrawn from the reactor 53 and passed through line 54 to a regenerator 55 in which small coke deposits incurred in the reactor are combustibly removed from the catalyst by the use of combustion air continuously injected into and withdrawn from the regenerator 55. After regeneration, the catalyst is continuously returned through line 56 to the reactor 53. Reaction products are conducted from the reactor 53 by line 57 through a condenser 97 and then to a fractionator 58 wherein heavy polymer and slurry are separated from the reaction products and removed from the unit through line 59. The remainder of the reactor effluent leaves the fractionator through line 60 in vapor form, and is partially condensed in condenser 98 and then separated in separator 99 into a recycle gas fraction and a hydrocracked naphtha fraction. A portion of the recycle gas fraction is compressed in compressor 100 and recycled through line 61 and heater 52 to the reactor 53. Excess recycle gas leaves the unit through line 62 at a rate controlled by a pressure maintenance valve 63, for use in the refinery gas plant or to storage. The hydrocracked naphtha fraction is removed from the hydrocracking unit through line 64.

The invention is applied to a catalytic hydrocracking system as illustrated in FIGURE 5, by means of a computer 65 deriving input data representative of naphtha feed, hydrocracked naphtha, slurry-polymer and excess recycle gas streams. A sample of naphtha feed is supplied by line 66 to an analyzer 67 which measures the concentrations of hydrogen and of sulfur in the sample. Similar samples of hydrocracked naphtha, slurry-polymer and excess recycle gas are transferred by lines 68, 69 and 70, respectively, to similar hydrogen and sulfur analyzers 71, 72, and 73. From the analyzers, input data in suitable analog or digital form and representing the hydrogen and sulfur concentrations in each of the four analyzed streams are supplied to computer 65 by lines 74–81. The computer utilizes the data in accordance with the mathematical functions described hereinbefore to generate a signal representative of the weight ratio between any two of the four streams analyzed. This signal can then be applied to modify operation of the hydrocracker through suitable servomechanisms of types now in wide use. For example, a need for increased reaction temperature generates a signal passed by line 82 to reset the temperature controller of heater 52. Gas recycle ratio is varied in response to a signal carried by line 83 which adjusts the capacity of gas recycle compressor 100. Alternatively, gas recycle ratio can be varied by adjustments of the flow rate of fresh naphtha feed into the unit. The catalyst flow rate through reactor 53 can be regulated by a signal passed by line 84 from computer 65 to a flow control valve 85 controlling the flow of regenerated catalyst from the regenerator 55 through line 56 to the reactor 53.

Preferably the system also includes an octane number monitor 86 from which a signal representing the octane level of a sample of the cracked naphtha stream withdrawn through line 87 may be supplied through line 88 to the computer 65. If desired, the octane number monitor can be alternatively applied to redistilled hydrocracked naphtha, for example after it has been debutanized in a conventional manner. The monitored octane values can then be employed with the monitored yield values for comparison with yield-octane relationships stored in a computer memory unit and for the generation of control signals such as those hereinbefore described, for process control responsive to the current yield-octane relationship.

Among methods known to those skilled in the art, beta ray analysis is one of several advantageous methods for accurately determining hydrogen content of the four streams monitored. X-ray analysis is an appropriate method for determination of stream sulfur content. Other methods such as mass spectometry and chromatography are also useful techniques for deriving information from which hydrogen and sulfur concentrations can be derived. For practice of the invention, any of these analytical techniques can be employed, as well as any other analyzing means appropriate for use in generating functions representative of hydrogen and sulfur concentrations of process streams.

It will be apparent from the nature of the mathematical relationships representing stream weight ratios for the catalytic hydrocracking example described hereinbefore that such relationships can readily be derived from input data representing appropriate stream component concentrations by a computer routine of the type hereinbefore described in connection with control of a three stream process according to the principles of this invention. It will be further evident from inspection of the nature of the mathematical relationships that in embodiments of the invention comprising even greater numbers of input and output streams and monitored stream components, such relationships will be in all instances of the same general nature, i.e. reducible to a series of linear arithmetic computations, so that in all cases a computer routine similar to the type described hereinbefore and illustrated in FIGURE 3 can be employed in the practice of the present invention.

From the foregoing, it will be appreciated that the invention is further applicable to various other continuous processes in which each component selected for use in monitoring the system enters the process at substantially the same rate at which it leaves the process, and in which each of the selected components is present in at least two of the streams of the process but in different concentrations, e.g. a continuous process involving a total of five streams as a sum of input and output streams and at least four stream components, or a continuous process involving a total of six streams as a sum of input and output streams and at least five stream components, as well as any such continuous process involving a total of at least three streams as a sum of input and output streams and stream components totaling at least the number of said streams less one.

Accordingly, it is to be understood that, although the present invention has been described with reference to preferred embodiments, resort to modifications and variations can be had without departing from the spirit and scope of the invention, as those skilled in the art will readily understand. Such variations and modifications are therefore considered to be within the purview and scope of the appended claims.

What is claimed is:

1. In a continuous process involving a total of at least three streams as a sum of all input and output streams and stream components differing in concentration between at least two of said streams and totaling at least the number of said streams less one, wherein each component selected for use in controlling said process is withdrawn from said process at substantially the same rate at which it enters said process, and in which each of the selected components is present in at least two of said streams but in different concentrations, the improvement which comprises generating a concentration function representing concentration, in each of said streams of said process, of each of a number of selected components at least as great as two less than the number of said streams in said process, employing said concentration functions to automatically generate a resultant function representing the weight ratio between two of said streams, generating a reference function representing a desired value of said weight ratio, automatically comparing said resultant function with said reference function to generate a control function representing the deviation of said resultant function from said reference function, and applying said control function to regulate a condition of said process with which said weight ratio varies, to maintain said weight ratio at the desired value.

2. In a method for controlling a continuous process involving a total of three streams as a sum of all input and output streams and stream components totaling at least two wherein the component selected for use in controlling said process is withdrawn from said process at substantially the same rate at which it enters said process, and in which the selected component is present in at least two of said streams but in different concentrations, the improvement which comprises generating a concentration function representing concentration of a selected component in each of said streams of said process, subtracting said concentration function for a first said stream from that of a third said stream to generate a first difference function, subtracting said concentration function for a second said stream from that of said third stream to generate a second difference function, dividing said first difference function by said second difference function to automatically generate a resultant function representing the weight ratio between said second stream and said first stream, generating a reference function representing a desired value of said weight ratio, automatically comparing said resultant function with said reference function to generate a control function representing the deviation of said resultant function from said reference function, and applying said control function to regulate a condition of said process with which said weight ratio varies, to maintain said weight ratio at the desired value.

3. In a continuous process involving a total of at least three streams as a sum of all input and output streams and stream components differing in concentration between at least two of said streams and totaling at least the number of said streams less one, wherein each component selected for use in controlling the process is withdrawn from said process at substantially the same rate at which it enters said process, and in which each of the selected components is present in at least two of said streams but in different concentrations, the improvement which comprises generating a concentration function representing concentration, in each of said streams of said process, of each of a number of selected components at least as great as two less than the number of said streams in said process, employing said concentration functions to automatically generate a resultant function representing the weight ratio between two of said streams, generating an operational function representing a variable characteristic of one of said streams, employing said resultant function and said operational function to generate a relational function representing the actual relationship between said weight ratio and said variable characteristic, generating a reference function representing a desired relationship between said weight ratio and said variable characteristic, and comparing said relational function and said reference function to generate a control function representing the deviation of said actual relationship from said desired relationship, applying said control function to regulate a condition of said process with which said relationship between said weight ratio and said variable characteristic varies, to maintain the relationship between said weight ratio and said variable characteristic at the value of said desired relationship.

4. In a method for the control of a process involving a total of it least three streams as a sum of all input and output streams and stream components differing in concentration between at least two of said streams and totaling at least the number of said streams less one, wherein each component selected for use in controlling said process is withdrawn from said process at substantially the same rate at which it enters said process, and in which each of the selected components is present in at least two of said streams but in different concentrations, to maintain a high yield of quality product, the improvement which comprises:

generating a physical representation of the concentration, in each of said streams of said process, of each of a number of selected components at least as great as two less than the number of said streams in said process, using said concentration functions to generate a resultant function representing the weight ratio between two of said streams, and applying a control function representative of the deviation of said resultant function from a predetermined value of said weight ratio to regulate a condition of said process with which said weight ratio varies, to maintain said weight ratio at the desired value.

5. A method, as defined in claim 4 in which said continuous process comprises catalytic reforming of a naphtha feed in the presence of hydrogen, and in which one of said selected compotnents is hydrogen.

6. A method, as defined in claim 4, in which said continuous process comprises catalytic hydrocracking of a petroleum hydrocarbon, and in which said selected components are hydrogen and sulfur.

7. In a method for controlling a continuous process involving a total of three streams as a sum of all input and output streams and stream components totaling at least two wherein the component selected for use in controlling said process is withdrawn from said process at substantially the same rate at which it enters said process, and in which the selected component is present in at least two of said streams but in different concentrations to maintain a high yield of quality product, the improvement which comprises:

generating a physical representation proportional to the concentration of a selected component in each of said streams of said process, subtracting the component concentration for a first said stream from that of a third said stream to generate a first difference function, subtracting the component concentration for a second said stream from that of said third stream to generate a second difference function, and dividing said first difference function by said second difference function to generate a resultant function representing the weight ratio between said second stream and said first stream, and applying a control function representative of the deviation of said resultant function from a predetermined value of said weight ratio to regulate a condition of said process with which said weight ratio varies, to maintain said weight ratio at the desired value.

8. In a method for controlling a continuous process for the catalytic reforming of a naphtha feed in the presence of hydrogen, involving a total of three streams as a sum of all input and output streams, wherein hydrogen is withdrawn from said process at substantially the same rate at which it enters said process, to maintain a high yield of quality gasoline, the improvement which comprises:

generating a physical representation proportional to the concentration of hydrogen in each of said streams of said process, subtracting the hydrogen concentration for a first said stream from that of a third said stream to generate a first difference function, subtracting the hydrogen concentration for a second said stream from that of said third stream to generate a second difference function, dividing said first difference function by said second difference function to generate a resultant function representing the weight ratio between said second stream and said first stream, and applying a control function representative of the deviation of said resultant function from a predetermined value of said weight ratio to regulate a condition of said process with which said weight ratio varies, to maintain said weight ratio at a desired value.

9. In a method for controlling a continuous process for the catalytic reforming of a naphtha feed in the presence of hydrogen, involving a total of three streams as a sum of all input and output streams, wherein hydrogen is withdrawn from said process at substantially the same rate at which it enters said process, to maintain a high yield of quality gasoline, the improvement which comprises:

generating physical representations proportional to the concentration of hydrogen in each of said streams of said process, the concentration of hydrogen for said streams being designated $a$, $b$, $c$ and generating a control function representative of said concentration of hydrogen according to the formula:

$$\pm \frac{c-a}{c-b}$$

and regulating a condition of said process, with which said weight ratio varies, in response to said control function to maintain said weight ratio at a desired value.

10. In a method for determining a weight ratio between two streams of a process involving a total of at least three streams as a sum of all input and output streams and stream components differing in concentration between at least two of said streams and totaling at least the number of said streams less one, wherein each component selected for use in determining the weight ratio is withdrawn from said process at substantially the same rate at which it enters said process, and in which each of the selected components is present in at least two of said streams but in different concentrations, to maintain a high yield of quality product, the improvement which comprises generating a physical representation of the concentration, in each of said streams of said process, of each of a number of selected components at least as great as two less than the number of said streams in said process, and using said concentration functions to generate a resultant function representing the weight ratio between two of said streams.

11. In a method for determining a weight ratio between two streams of a continuous process involving a total of three streams as a sum of all input and output streams and stream components totaling at least two wherein a component selected for use in determining the weight ratio is withdrawn from the process at substantially the same rate at which it enters the process, and in which the selected component is present in at least two of said streams but in different concentrations, to maintain a high yield of quality product, the improvement which comprises:

generating a physical representation proportional to the concentration of the selected component in each of said streams of said process, subtracting the component concentration for a first said stream from that of a third said stream to generate a first difference function, subtracting the component concentration for a second said stream from that of said third stream to generate a second difference function, and dividing said first difference function by said second difference function to generate a resultant function representing the weight ratio between said second stream and said first stream.

12. In a method for determining a weight ratio between two streams of a continuous process for the catalytic reforming of a naphtha feed in the presence of hydrogen, involving a total of three streams as a sum of all input and output streams, wherein hydrogen is withdrawn from said process at substantially the same rate at which it enters said process, to maintain a high yield of quality gasoline, the improvement which comprises:

generating a physical representation proportional to the concentration of hydrogen in each of said streams of said process, subtracting the hydrogen concentration for a first said stream from that of a third said stream to generate a first difference function, subtracting the hydrogen concentration for a second said stream from that of said third stream to generate a second difference function, and dividing said first difference function by said second difference function to generate a resultant function representing the weight ratio between said second stream and said first stream.

13. In a method for determining a weight ratio between two streams of a continuous process for the catalytic reforming of a naphtha feed in the presence of hydrogen, involving a total of three streams as a sum of all input and output streams, wherein hydrogen is withdrawn from said process at substantially the same rate at which it enters said process, to maintain a high yield of quality gasoline, the improvement which comprises generating physical representations proportional to the concentration of hydrogen in each of said streams of said process, the concentration of hydrogen for said streams being designated $a, b, c$ and generating a function representative of said concentration of hydrogen according to the formula:

$$\pm \frac{c-a}{c-b}$$

14. A method, as defined in claim 10, wherein said continuous process is catalytic reforming of a naphtha feed in the presence of hydrogen from which an effluent stream is recovered, said effluent stream being separated into a gas stream and a liquid stream, said gas stream being further separated into a discharge gas stream and a recycle gas stream for admixture with the naphtha feed, and said naphtha feed, said liquid stream and said discharge gas stream being all input and output streams; and wherein the only component selected for use in determining the weight ratio is hydrogen, and said resultant function is representative of the ratio of concentrations of hydrogen according to the formula:

$$\pm \frac{c-a}{c-b}$$

wherein:

$a$ = the weight fraction of hydrogen in the naphtha feed,
$b$ = the weight fraction of hydrogen in the liquid stream, and
$c$ = the weight fraction of hydrogen in the discharge gas stream.

References Cited

UNITED STATES PATENTS 3,000,812   9/1961   Boyd _____ 208—138

OTHER REFERENCES

Lyon et al., American Petroleum Institute, Division of Refining, May 1962 Proceedings, vol. 42 [III], (1962), pp. 602–609.

HERBERT LEVINE, Primary Examiner

U.S. Cl. X.R.

23—230, 253; 208—134; 235—151.12, 151.35